United States Patent
Lay et al.

(10) Patent No.: US 9,333,451 B2
(45) Date of Patent: May 10, 2016

(54) INLINE DUMP-ABLE FUEL SYSTEM DUST FILTER

(71) Applicants: GM Global Technology Operations LLC, Detroit, MI (US); Stoneridge, Inc., Warren, OH (US)

(72) Inventors: Karen E. Lay, Madison Heights, MI (US); Robert J. Steinman, Lexington, OH (US)

(73) Assignees: GM Global Technology Operations LLC, Detroit, MI (US); Stoneridge, Inc., Warren, OH (US)

(*) Notice: Subject to any disclaimer, the term of this patent is extended or adjusted under 35 U.S.C. 154(b) by 100 days.

(21) Appl. No.: 14/215,403

(22) Filed: Mar. 17, 2014

(65) Prior Publication Data

US 2015/0260134 A1    Sep. 17, 2015

(51) Int. Cl.
*B01D 46/00* (2006.01)
*B01D 46/24* (2006.01)

(52) U.S. Cl.
CPC ........ *B01D 46/0005* (2013.01); *B01D 46/0012* (2013.01); *B01D 46/0045* (2013.01); *B01D 46/2403* (2013.01); *Y10T 29/49817* (2015.01)

(58) Field of Classification Search
CPC ...... B01D 29/13; B01D 46/241; B01D 45/08; B01D 46/0043; B01D 50/002; B01D 29/21; B01D 29/032; B01D 46/0005; B60K 15/035; B60K 2015/03236; B01B 85/02

USPC ............ 55/504, 490, 385.3; 123/198 E, 447; 210/248, 438, 450, 454

See application file for complete search history.

(56) References Cited

U.S. PATENT DOCUMENTS

| | | | | |
|---|---|---|---|---|
| 6,488,845 B1* | 12/2002 | Neufeld | ................ | B01D 29/21 210/232 |
| 6,506,303 B1* | 1/2003 | Gustafsson | ............ | B01D 29/21 210/248 |
| 2008/0202081 A1* | 8/2008 | Schmid | ................ | B01D 35/153 55/385.3 |
| 2008/0236393 A1* | 10/2008 | Heller | ................ | B01D 46/0005 95/273 |
| 2010/0044295 A1* | 2/2010 | Honermann | ......... | B01D 29/232 210/234 |
| 2012/0298145 A1* | 11/2012 | Rife | ......................... | B08B 5/02 134/22.18 |
| 2014/0150388 A1* | 6/2014 | Girondi | .............. | B01D 46/2411 55/504 |
| 2014/0216408 A1* | 8/2014 | Nagao | ................. | F02D 41/3845 123/447 |
| 2015/0226158 A1* | 8/2015 | Kurosawa | .......... | F02M 21/0212 55/487 |
| 2015/0231964 A1* | 8/2015 | Sonderegger | ........ | B60K 15/035 55/332 |

* cited by examiner

*Primary Examiner* — Duane Smith
*Assistant Examiner* — Minh-Chau Pham
(74) *Attorney, Agent, or Firm* — BrooksGroup

(57) ABSTRACT

A number of variations may include a product comprising a dump-able filter comprising: a filter body; a filter assembly, wherein the filter assembly is seated in the filter body; and a filter cap, wherein the filter cap attaches to the filter body and encloses at least a portion of the filter assembly.

16 Claims, 4 Drawing Sheets

INLINE DUMP-ABLE FUEL SYSTEM DUST FILTER

TECHNICAL FIELD

The field to which the disclosure generally relates to includes filters.

BACKGROUND

A fuel system may include a filter.

SUMMARY OF ILLUSTRATIVE VARIATIONS

One variation may include a product comprising a dump-able filter comprising: a filter body; a filter assembly, wherein the filter assembly is seated in the filter body; and a filter cap, wherein the filter cap attaches to the filter body and encloses at least a portion of the filter assembly.

Another variation may include a method comprising providing a dump-able dust filter for a fuel system comprising: providing a filter assembly inside of a filter body and a filter cap; rotating the filter cap in a first direction to lock the filter cap onto the filter body; rotating the filter cap in a second direction to unlock the filter cap from the filter body; removing contaminants from the dump-able dust filter; and replacing the filter cap back onto the filter body and rotating the filter cap in a first direction to lock the filter cap onto the filter body.

Another variation may include a method comprising providing a dump-able dust filter for a fuel system comprising: providing a first filter assembly inside of a filter body and a filter cap; rotating the filter cap in a first direction to lock the filter cap onto the filter body; rotating the filter cap in a second direction to unlock the filter cap from the filter body; removing the first filter assembly from the filter body; providing a second filter assembly inside of the filter body; and replacing the filter cap back onto the filter body and rotating the filter cap in a first direction to lock the filter cap onto the filter body.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
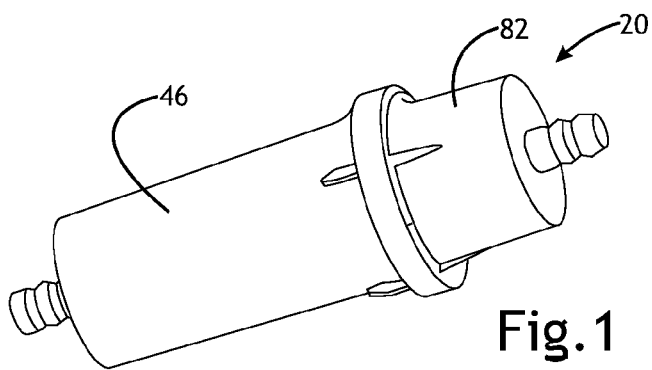
FIG. 1 illustrates a perspective view of a dump-able dust filter according to a number of variations.
Figure 2:
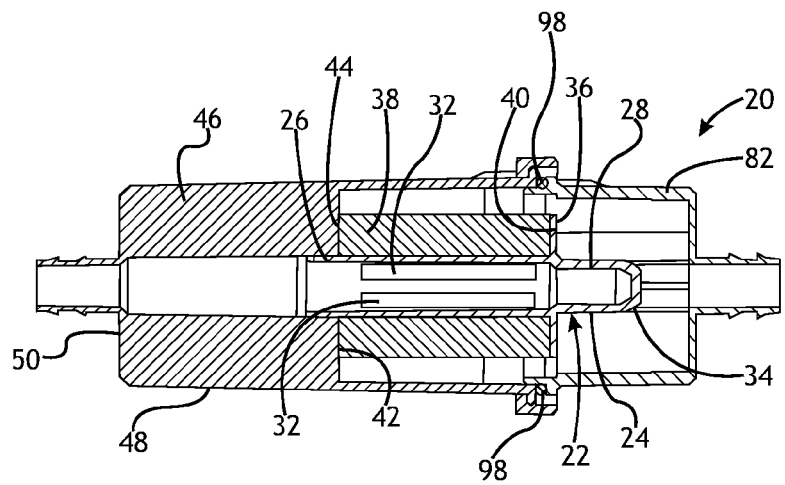
FIG. 2 illustrates a sectional view of a dump-able dust filter according to a number of variations.

Referring to FIGS. 1 and 2, in a number of variations a product may comprise a dump-able dust filter 20. A dump-able dust filter 20 may comprise a filter assembly 22, a filter body 46, an O-ring 98, and a filter cap 82. The dump-able dust filter 20 may allow dust and/or other contaminants to be dumped out of the dump-able dust filter 20 periodically so that the dump-able dust filter 20 may be reused numerous times which may increase the life of the dump-able filter 20 and/or the fuel system canister 112, as will be discussed below. While an automotive vehicle fuel system 108 is illustrated below for exemplary purposes, it should be recognized that the dump-able dust filter 20 may be used to protect any number of fuel systems including, but not limited to, tractors, dirt bike, lawn mower and/or general lawn equipment, four-wheelers, and/or recreational vehicle systems. The dump-able dust-filter 20 may also be used for in an engine air intake system and/or in a cooling air system for any number of electric motors. The dump-able dust filter 20 may also be implemented into a pond filter.

Figure 3:
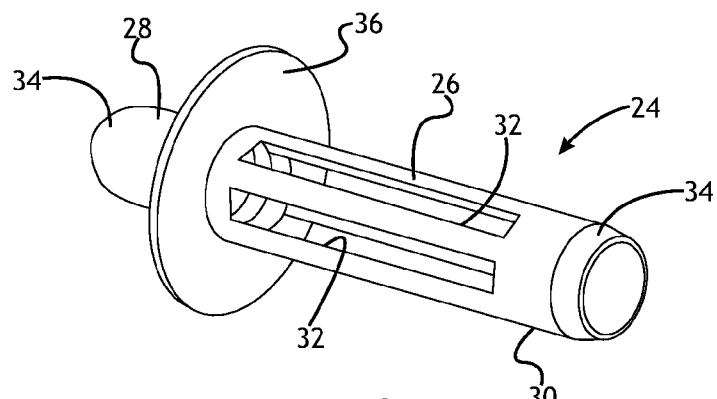
FIG. 3 illustrates a perspective view of a filter carrier according to a number of variations.

Referring to FIGS. 2-5, in a number of variations, a filter assembly 22 may include a filter carrier 24 and a filter element 38. In a number of variations, a filter carrier 24 may comprise a body 26, a first end 28, and a second end 30 and may be any number of shapes including, but not limited to cylindrical. The filter carrier 24 may be hollow and may act as a flow passage for air that may travel therethrough. The filter carrier body 26 may include one or more slots 32 which may be constructed and arranged to allow an air flow to travel through a filter element 38 and into a filter body center tunnel 64 as will be discussed hereafter. The first end 28 may be constructed and arranged to mate with a filter cap 82 as will be discussed hereafter. The first end 28 may include a taper 32 inward which may assist in assembly of the filter cap 82 onto the filter carrier 24 as will be discussed hereafter. The second end 30 may also include a taper 32 inward, for example as illustrated in FIG. 3, which may assist in assembly of the filter carrier 24 into a filter body center tunnel 64 as will be discussed hereafter. A lip 36 may extend radially from the filter carrier body 26 adjacent the first end 28. The filter carrier 24 may be any of a number of materials including, but not limited to one or more polymeric materials.

Figure 5:
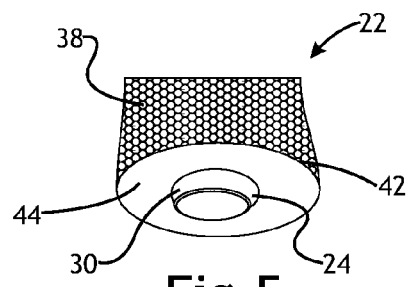
FIG. 5 illustrates a bottom perspective view of a filter element according to a number of variations.
Figure 6:
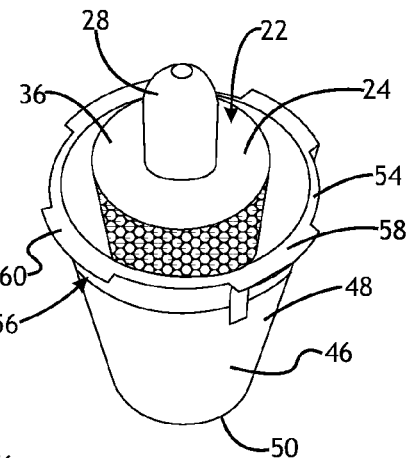
FIG. 6 illustrates a perspective view of a filter body and a filter assembly according to a number of variations.

In any number of variations, a filter element 38 may be assembled onto the filter carrier body 26. The filter element 38 may comprise a first end 40 and a second end 42. The first end 42 of the filter element 38 may seat against the lip 36 of the filter carrier 24 and the second end 42 of the filter element 38 may extend a distance along the filter carrier body 26 so that a portion of the second end 30 of the filter carrier 24 may be exposed, for example as illustrated in FIG. 5. The filter element 38 may comprise any number of materials including, but not limited to, any number of foams, pleated woven plastic, woven fibers, non-woven fibers, screens, and/or pleated paper. In a number of variations, the second end 42 of the filter element 40 may include a barrier element 44, for example as illustrated in FIG. 5, which may assist in containing dust/contaminants that may collect in the dust/contamination collection chamber 76 located in the filter body 46 from entering back into the air flow path and into the filter element 38. The first end 40 may also include a barrier element 44 which may element the need for a particular orientation of the filter element 38 during assembly. The barrier element 44 may comprise any number of materials including, but not limited to, a foil.

Figure 4:
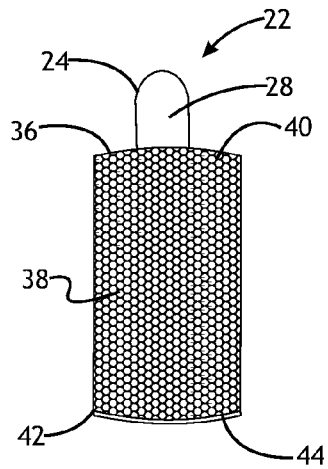
FIG. 4 illustrates a perspective view of a filter element according to a number of variations.
Figure 7:
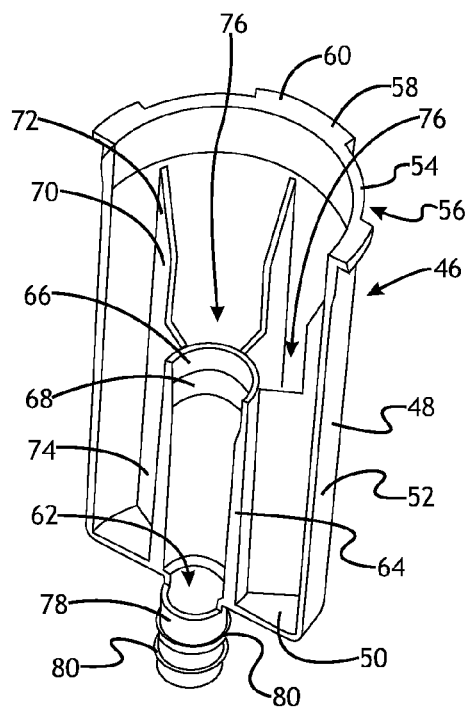
FIG. 7 illustrates a section view of a filter body according to a number of variations.
Figure 8:
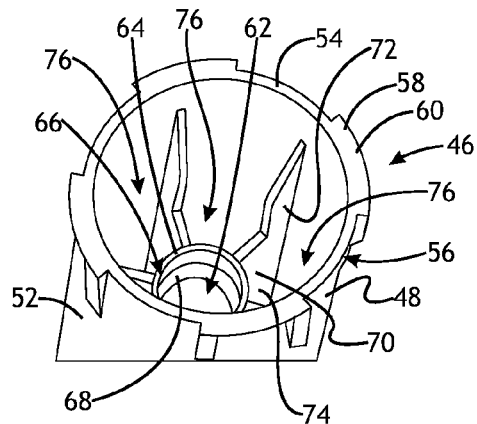
FIG. 8 illustrates a top perspective view of a filter body according to a number of variations.

Referring to FIGS. 1-2 and 6-8, in a number of variations, the filter assembly 22 may be placed inside of a filter body 46. In a number of variations, a filter body 46 may comprise a cup component 48, a center tunnel 64, one or more collection chambers 76, and an outlet port 78, best illustrated in FIG. 7. The cup component 48 may comprise a base 50 and a body structure 52. The cup component 48 may be any number of shapes including, but not limited to, cylindrical. A lip 54 may extend radially outward from the perimeter of a first end 56 of the body structure 52. The lip 54 may also include one or more locking features 58 including, but not limited to twist lock tabs 60 which may be constructed and arranged to mate and lock with a filter cap 82 locking feature 96 as will be discussed hereafter. A through-hole 62 may extend through the base 50 of the cup component 48 so that air may exit the filter body 46 through the outlet port 78. The center tunnel 64 may extend a distance upward from the perimeter of the through-hole 62 in the base 50 of the cup component 48 and may act as a flow passage for air which may be traveling through the dump-able filter 20 as will be discussed hereafter. A first end 66 of the center tunnel 64 may be constructed and arranged to mate with a second end 30 of the filter carrier 24. The first end 66 of the center tunnel 64 may also include a chamfer 68 which may assist in the assembly of the filter carrier 24 into the filter body 46, best illustrated in FIGS. 7 and 8. A plurality of chamber walls 70 may extend from the center tunnel 64 to the body structure 52. The chamber walls 70 may each include an upper portion 72 and a lower portion 74. The lower portion 74 of the chamber walls 70 may be constructed and arranged to form one or more dust/contaminant collection chambers 76, for example as illustrated in FIG. 7. The upper portion 72 may be constructed and arranged to provide a lead-in angle for installation of the filter assembly 22. The upper portion 72 may also be constructed and arranged to assist in centering the filter assembly 22 in the filter body 46. In one variation, the lower portion 74 may extend horizontally from the center tunnel 64 to the body structure 52 and may form an approximate 90 degree angle with the upper portion 72. The upper portion 72 may extend upward and may gradually taper inward as it extends upward toward the first end 56 of the body structure 52, for example as illustrated in FIGS. 7 and 8. The outlet port 78 may extend downward from the perimeter of the through-hole 62 on the base 50 of the cup component 48. The outlet port 78 may be any number of shapes including, but not limited to, cylindrical and may include one or more locking features 80 which may include, but are not limited to, one or more locking tabs, for example as illustrated in FIG. 4. The outlet port 78 may be constructed and arranged to operatively connect with any number of vehicle components including, but not limited to, a fresh air line or canister vent solenoid (CVS). The filter body 46 may comprise any number of materials including, but not limited to, one or more polymeric materials.

Figure 9:
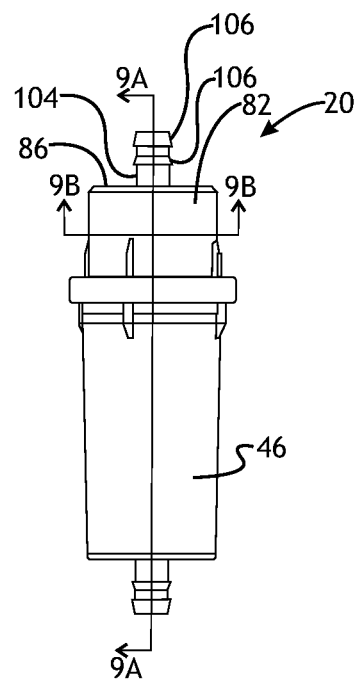
FIG. 9 illustrates a side view of a dump-able dust filter according to a number of variations.
Figure 9B:
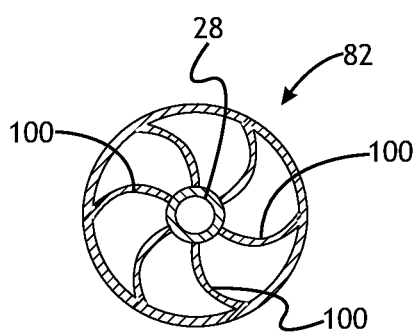
FIG. 9B illustrates a section view of B-B of FIG. 9 according to a number of variations.
Figure 9A:
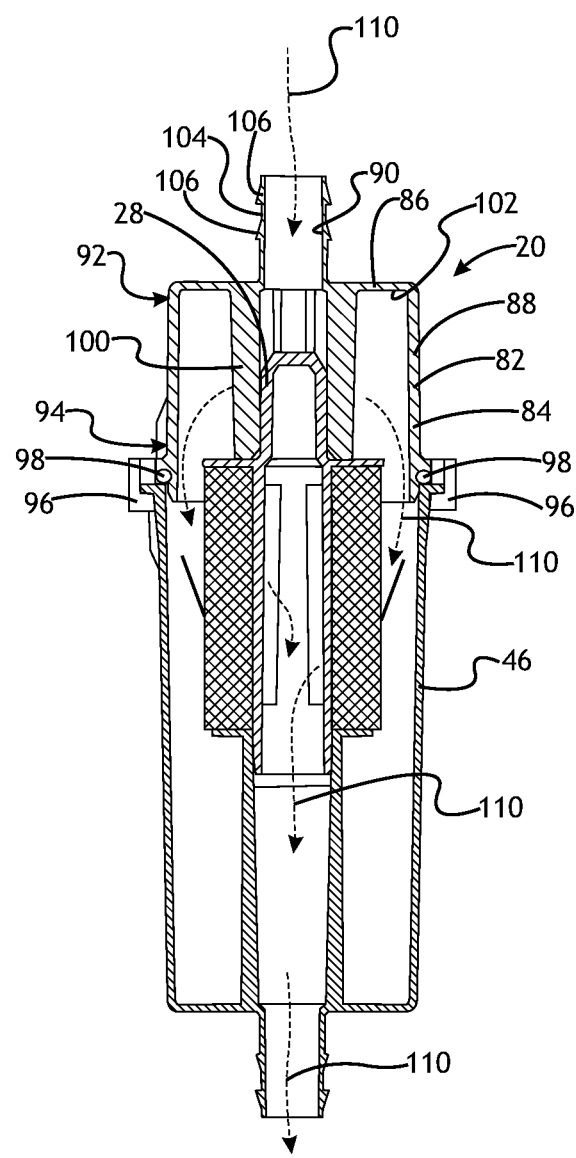
FIG. 9A illustrates a section view of A-A of FIG. 9 according to a number of variations.
Figure 10:
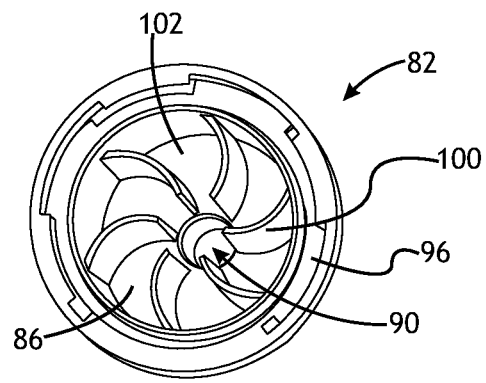
FIG. 10 illustrates a bottom view of a filter cap according to a number of variations.

Referring to FIGS. 1-2 and 9-10, in a number of variations, a filter cap 82 may be placed on top of the filter body 46 to enclose the filter assembly 22. The filter cap 82 may comprise a cap structure 84, a plurality of spiral vanes 100, and an inlet port 104. In a number of variations, the cap structure 84 may comprise a top component 86 and a body component 88. A through-hole 90 may extend through the top component 86 and may be constructed and arranged to allow air into the dump-able filter 20. The body component 88 may include a first end 92 and a second end 94 and may be any number of shapes including, but not limited to, cylindrical. A locking feature 96 may extend radially from the perimeter of a second end 94 of the body component 88. The locking feature 96 may also be constructed and arranged to house an O-ring 98, for example as illustrated in FIG. 9A. The O-ring 98 may help to ensure that the filter cap 82 and filter body 46 are properly sealed together with little to no gaps which may further prevent dust and/or other contaminants from exiting the dump-able filter 20. The O-ring 98 may comprise any number of materials including, but not limited to, an elastomeric material. The locking feature 96 may be any variation of locking features including, but not limited to, a twist lock feature wherein when the filter cap 82 may be placed on top of the filter body 46 and twisted or rotated in a first direction, the filter cap 82 may lock the tabs 60 on the filter body 46 in place which may lock the filter cap 82 and the filter body 46 together. The filter cap 82 and filter body 46 may make a locking or snapping noise which may indicate to an operator that the filter cap 82 is properly locked onto the filter body 46. An operator may also be able to visually see that the filter cap 82 is properly locked onto the filter body 46. The locking feature 96 may also be tactile so that an operator may feel when the filter cap 82 properly locks onto the filter body 46. This may ensure that the dump-able filter 20 is properly locked into place during assembly or during maintenance. The filter cap 82 and filter body 46 may be unlocked by twisting and/or rotating the filter cap 82 in the opposite direction. In another variation, the filter cap 82 and the filter body 46 may be bonded together, for example but not limited to, welding, however, the dust filter 20 may then be a single use filter.

A plurality of spiral vanes 100 may extend from an inner surface 102 of the top component 86 and may be constructed and arranged to accommodate a first end 28 of the filter carrier 24. The plurality of spiral vanes 100 may be constructed and arranged to increase a surface area of the air flow which may assist in capturing finer dust and/or other contaminants including, but not limited to, mist, as will be discussed below.

The inlet port 104 may extend upward from the perimeter of the through-hole 90 extending through the top component 86 of the cap structure 84. The inlet port 104 may include one or more locking features 106 which may include, but are not limited to, one or more locking tabs, for example as illustrated in FIGS. 9 and 9A. The inlet port 104 may be constructed and arranged to operatively connect with any number of vehicle components including, but not limited to, a pre-filter or an outside air source.

Figure 11:
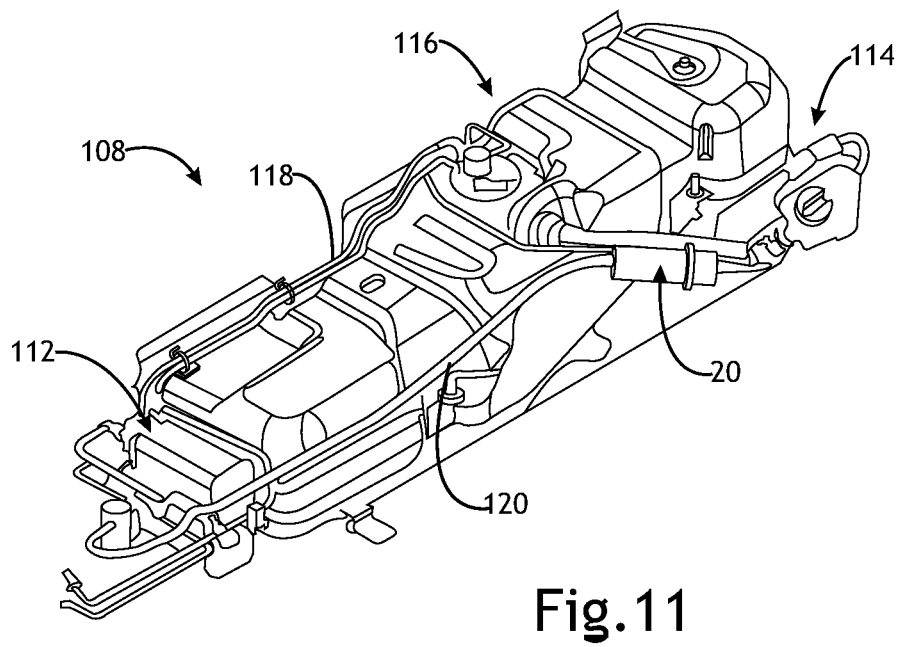
FIG. 11 illustrates a perspective view of a dump-able filter in a fuel system according to a number of variations.

Referring to FIG. 11, in a number of variations, the dump-able filter 20 may be compact and may be attached in various configurations and locations in a vehicle to protect the vehicle's fuel system 108 from dust and/or other contaminants. The dump-able filter 20 may be designed so that it may function in a vertical and/or horizontal position, or any position therebetween. In one variation, the dump-able filter 20 may be attached onto the fresh air line between the CVS and the prefilter 114 or the outside environment. The dump-able filter 20 may be added or removed to an evaporative emission system that may previously exist in a vehicle or may be implemented into a vehicle as the sole dust protection for various systems. Referring to FIG. 9A, in a number of variations, dust and/or other contaminants may enter into the inlet port 104 of the dump-able filter 20. Air, dust, and/or any number of contaminants may then travel through the spiral vanes 100 in the filter cap 82. The spiral vanes 100 may be constructed and arranged to increase the surface area for capturing finer dust and/or other contaminants including, but not limited to, mist. The dump-able filter 20 may be designed so that the dust and/or other contaminants have an increased velocity at the spiral vanes 100 and a decreased velocity as they pass through the filter assembly 22 which may cause the courser dust and/or other contaminant elements to drop out of the flow path 110 and into the dust/contamination collection chambers 76 of the filter body 46, and wherein the finer dust and/or other contaminant elements adhere to the filter assembly 22. Dust/contaminants that accumulate in the dust/contaminant collection chamber 76 and the filter assembly 22 may then be removed during servicing. This may eliminate or reduce the need to replace the entire filter and/or the entire evaporative emission system including the fuel system canister 112 as will be discussed below.

Referring again to FIG. 11, in a number of variations, during refueling of the vehicle, the air flow may be reversed while fuel is entering into the vehicle tank 116. This may cause the fuel vapor in the tank 116 to be displaced by the fuel volume which may cause the fuel vapor to move from the tank 116 through a first tube or pipe 118 to the canister 112, which may comprise any number of materials including, but not limited to, a carbon, and again through a second tube or pipe 120 to the dump-able dust filter 20. The canister 112 may be designed to remove fuel vapor. The reverse flow may dislodge a portion of dust/contaminant from the filter element 38. The dislodged dust/contaminants may then be recaptured by the filter element 38 when the air flow returns to its normal operating state which may occur when the vehicle may be running. The normal operating state may be used to remove any captured fuel vapor which may be in the canister 112 and may meter the vapor into the engine air intake. Therefore, the dump-able dust filter 20 may function as a part of the path for fuel tank air to be released to the atmosphere during refueling.

In a number of variations, various dump-able filters 20 may include different configurations for higher efficiency situations or moderate efficiency situations depending on a customer's vehicle dust/contaminant exposure. Therefore, a customer may easily replace the filter assembly 22 in a vehicle if the customer's dust/contaminant exposure increases or decreases.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: a dump-able filter comprising: a filter body; a filter assembly, wherein the filter assembly is seated in the filter body; and a filter cap, wherein the filter cap attaches to the filter body and encloses at least a portion of the filter assembly.

Variation 2 may include a product as set forth in Variation 1 further comprising an O-ring which seats between the filter body and the filter cap to seal the dump-able filter assembly when the filter cap and the filter body are attached together.

Variation 3 may include a product as set forth in any of Variations 1-2 wherein the filter cap interlocks with the filter body when the filter cap is rotated in a first direction onto the filter body and wherein the filter cap unlocks with the filter body when the filter cap is rotated in a second direction.

Variation 4 may include a product as set forth in any of Variations 1-3 wherein the filter cap comprises an inlet port which is constructed and arranged to connect to a vehicle component.

Variation 5 may include a product as set forth in any of Variations 1-4 wherein the vehicle component is at least one of a pre-filter or an outside air source.

Variation 6 may include a product as set forth in any of Variations 1-5 wherein the filter body comprises an outlet port which is constructed and arranged to connect to a vehicle component.

Variation 7 may include a product as set forth in any of Variations 1-6 wherein the vehicle component is at least one of a fresh air line or a canister vent solenoid (CVS).

Variation 8 may include a product as set forth in any of Variations 1-7 wherein the filter cap, the filter assembly, and the filter body form an air flow tunnel which directs an air flow through a flow path, wherein fine contaminants in the air flow adhere to the filter assembly and course contaminants drop into at least one contaminant collection chamber in the filter body.

Variation 9 may include a product as set forth in any of Variations 1-8 wherein the air flow enters into the dump-able filter through an inlet port, is directed through a plurality of spiral vanes located in the filter cap, through a filter carrier body in the filter assembly, through a center tunnel in the filter body, and exits through an outlet port on the filter body.

Variation 10 may include a product as set forth in any of Variations 1-9 wherein the filter assembly comprises: a filter carrier comprising a hollow body including at least one slot, a first end constructed and arranged to mate with the filter cap, a second end constructed and arranged to mate with a filter body, and a lip which extends radially from the hollow body adjacent the first end, and a filter element which extends around the hollow body of the filter carrier, and wherein the filter element includes a barrier element which is attached to at least one of a bottom surface or a top surface of the filter carrier.

Variation 11 may include a product as set forth in any of Variations 1-10 wherein the filter cap comprises a cap structure, wherein the cap structure comprises a top component, a body component, and a plurality of spiral vanes which extend downward from the top component, wherein the body component comprises a first end and a second end, wherein the second end comprises a locking feature which extends radially from the perimeter of the second end and is constructed and arranged to lock together with the filter body; and an inlet port which extends upward from the top component.

Variation 12 may include a product as set forth in any of Variations 1-11 wherein the filter cap is constructed and arranged to house an O-ring.

Variation 13 may include a product as set forth in any of Variations 1-12 wherein the filter body comprises a cup component having a first end and a second end, and wherein a lip extends radially from the first end and includes at least one locking feature which is constructed and arranged to lock together with the filter cap; a center tunnel which extends inside the cup component having a first end and a second end, wherein the first end is constructed and arranged to mate with a filter carrier; at least one contamination collection chamber interposed between the cup component and the center tunnel; and an outlet port.

Variation 14 may include a product as set forth in any of Variations 1-13 further comprising a fuel system, and wherein the dump-able filter is operatively connected to the fuel system.

Variation 15 may include a product as set forth in Variation 14 wherein the dump-able filter functions as a part of the path for fuel tank air to be released to the atmosphere during refueling.

Variation 16 may include a product comprising a dump-able dust filter for a fuel system comprising: a filter body; a filter assembly, wherein at least a portion of the filter assembly is interposed inside the filter body; and a filter cap, wherein the filter cap encloses at least a portion of the filter assembly and locks with the filter body.

Variation 17 may include a product as set forth in Variation 16 wherein the dump-able dust filter is constructed and arranged to remove contaminants from an air flow by sending the air flow through an inlet port on the filter cap, through a plurality of spiral vanes in the filter cap, through a filter carrier in the filter assembly, through a center tunnel in the filter body, and out an outlet port on the filter body; and wherein fine contaminants adhere to the filter assembly, and wherein course contaminants drop out of the flow path into at least one contaminant collection chamber in the filter body.

Variation 18 may include a product as set forth in any of Variations 16-17 further comprising an O-ring interposed between the filter cap and the filter body.

Variation 19 may include a method comprising: providing a dump-able dust filter for a fuel system comprising: providing a filter assembly inside of a filter body and a filter cap; rotating the filter cap in a first direction to lock the filter cap onto the filter body; rotating the filter cap in a second direction to unlock the filter cap from the filter body; removing contaminants from the dump-able dust filter; and replacing the filter cap back onto the filter body and rotating the filter cap in a first direction to lock the filter cap onto the filter body.

Variation 20 may include a method comprising: providing a dump-able dust filter for a fuel system comprising: providing a first filter assembly inside of a filter body and a filter cap; rotating the filter cap in a first direction to lock the filter cap onto the filter body; rotating the filter cap in a second direction to unlock the filter cap from the filter body; removing the first filter assembly from the filter body; providing a second filter assembly inside of the filter body; and replacing the filter cap back onto the filter body and rotating the filter cap in the first direction to lock the filter cap onto the filter body.

The above description of select variations within the scope of the invention is merely illustrative in nature and, thus, variations or variants thereof are not to be regarded as a departure from the spirit and scope of the invention.

What is claimed is:

1. A product comprising:
a dump-able filter comprising:
a filter body;
a filter assembly comprising a filter carrier having at least one slot and a cylindrical filter element surrounding a portion of the filter carrier, wherein the filter assembly is seated in the filter body;
a filter cap, wherein the filter cap attaches to the filter body and encloses at least a portion of the filter assembly;
wherein the filter body comprises an outlet port which is constructed and arranged to connect to a vehicle component; and
wherein the vehicle component is at least one of a fresh air line or a canister vent solenoid (CVS).

2. The product of claim 1 further comprising an O-ring which seats between the filter body and the filter cap to seal the dump-able filter assembly when the filter cap and the filter body are attached together.

3. The product of claim 1 wherein the filter cap interlocks with the filter body when the filter cap is rotated in a first direction onto the filter body and wherein the filter cap unlocks with the filter body when the filter cap is rotated in a second direction.

4. The product of claim 1 wherein the filter cap comprises an inlet port which is constructed and arranged to connect to the vehicle component.

5. The product of claim 4 wherein the vehicle component is at least one of the fresh air line or the canister vent solenoid (CVS), or a pre-filter or an outside air source.

6. The product of claim 1 wherein the filter cap, the filter assembly, and the filter body form an air flow tunnel which directs an air flow through a flow path, wherein fine contaminants in the air flow adhere to the filter assembly and course contaminants drop into at least one contaminant collection chamber in the filter body.

7. The product of claim 6 wherein the air flow enters into the dump-able filter through an inlet port, is directed through a plurality of spiral vanes located in the filter cap, through the filter carrier in the filter assembly, through a center tunnel in the filter body, and exits through an outlet port on the filter body.

8. A product comprising:
a dump-able filter comprising:
a filter body;
a filter assembly comprising a filter carrier having at least one slot and a cylindrical filter element surrounding a portion of the filter carrier, wherein the filter assembly is seated in the filter body; and
a filter cap, wherein the filter cap attaches to the filter body and encloses at least a portion of the filter assembly;
wherein the filter carrier further comprises a hollow body including the at least one slot, a first end constructed and arranged to mate with the filter cap, a second end constructed and arranged to mate with the filter body, and a lip which extends radially from the hollow body adjacent the first end, and wherein the filter element extends around the hollow body of the filter carrier, and wherein the filter element includes a barrier element which is attached to at least one of a bottom surface or a top surface of the filter carrier.

9. The product of claim 1 wherein the filter cap comprises:
a cap structure, wherein the cap structure comprises a top component, a body component, and a plurality of spiral vanes which extend downward from the top component, wherein the body component comprises a first end and a second end, wherein the second end comprises a locking feature which extends radially from the perimeter of the second end and is constructed and arranged to lock together with the filter body; and
an inlet port which extends upward from the top component.

10. The product of claim 9 wherein the filter cap is constructed and arranged to house an O-ring.

11. The product of claim 1 wherein the filter body comprises a cup component having a first end and a second end, and wherein a lip extends radially from the first end and includes at least one locking feature which is constructed and arranged to lock together with the filter cap; a center tunnel which extends inside the cup component having a first end and a second end, wherein the first end is constructed and arranged to mate with a filter carrier; at least one contamination collection chamber interposed between the cup component and the center tunnel; and an outlet port.

12. The product of claim 1 further comprising a fuel system, and wherein the dump-able filter is operatively connected to the fuel system.

13. The product of claim 12 wherein the dump-able filter functions as a part of a path for fuel tank air to be released to the atmosphere during refueling.

14. A product comprising a dump-able dust filter for a fuel system comprising:
- a filter body;
- a filter assembly comprising a filter carrier having at least one slot and a cylindrical filter element surrounding a portion of the filter carrier, wherein at least a portion of the filter assembly is interposed inside the filter body; and
- a filter cap, wherein the filter cap encloses at least a portion of the filter assembly and locks with the filter body;

wherein the dump-able filter is operatively connected to the fuel system and functions as a part of a path for fuel tank air to be released to the atmosphere during refueling.

15. The product of claim 14 wherein the dump-able dust filter is constructed and arranged to remove contaminants from an air flow by sending the air flow through an inlet port on the filter cap, through a plurality of spiral vanes in the filter cap, through the at least one slot, and through the filter element into a center tunnel in the filter body, and out an outlet port on the filter body; and wherein fine contaminants adhere to the filter element, and wherein course contaminants drop out of the flow path into at least one contaminant collection chamber in the filter body.

16. The product of claim 14 further comprising an O-ring interposed between the filter cap and the filter body.

* * * * *